(12) United States Patent
Maresh et al.

(10) Patent No.: US 7,311,203 B2
(45) Date of Patent: Dec. 25, 2007

(54) GEOMETRICALLY-CONFIGURED FLEXIBLE PACKAGING ASSEMBLY

(75) Inventors: Mark E. Maresh, Grand Ledge, MI (US); Eric A. Stegner, Durham, NC (US); Christopher M. Turner, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 769 days.

(21) Appl. No.: 10/725,792

(22) Filed: Dec. 2, 2003

(65) Prior Publication Data

US 2005/0115858 A1 Jun. 2, 2005

(51) Int. Cl.
*B65D 81/02* (2006.01)

(52) U.S. Cl. ............... 206/521; 206/320; 206/701

(58) Field of Classification Search .............. 206/521, 206/521.1, 521.2, 591, 592, 701, 706, 316.1, 206/320

See application file for complete search history.

(56) References Cited

U.S. PATENT DOCUMENTS

| | | | | | |
|---|---|---|---|---|---|
| 2,160,893 | A | * | 6/1939 | Newsom | 206/521.8 |
| 5,259,508 | A | * | 11/1993 | Beckerman | 206/587 |
| 5,320,226 | A | * | 6/1994 | Merrill | 206/521 |
| 5,385,232 | A | * | 1/1995 | Foos et al. | 206/320 |
| 5,706,951 | A | * | 1/1998 | Oinuma et al. | 206/710 |
| 5,954,203 | A | * | 9/1999 | Marconi | 206/464 |
| 6,123,200 | A | * | 9/2000 | Stephens et al. | 206/592 |
| 6,405,873 | B2 | * | 6/2002 | Koike | 206/592 |
| 6,820,743 | B2 | * | 11/2004 | Hurley et al. | 206/427 |
| 7,093,717 | B2 | * | 8/2006 | Sakai et al. | 206/591 |
| 2002/0023857 | A1 | * | 2/2002 | Smith | 206/588 |
| 2004/0055929 | A1 | * | 3/2004 | Smith | 206/591 |

* cited by examiner

*Primary Examiner*—Mickey Yu
*Assistant Examiner*—Jerrold Johnson
(74) *Attorney, Agent, or Firm*—Anthony M. Del Zoppo, III; Driggs, Hogg & Fry Co., LPA

(57) ABSTRACT

A packaging apparatus comprising a pulp-based composition that provides protection to an equipment component (or other fragile or breakable item), provides ease in use during pre-packing and packing of an equipment component for transport, does not require the need for additional packing components in combination with the packaging assembly, provides shock protection during transport, is reusable, and is economically suited for its end use, is provided for. In accordance with one aspect of the present invention, the present invention is a molded, one piece packing assembly comprised of substantially a pulp-based composition. The present invention is advantageously designed using specific geometries which, contrary to traditional designs, benefit from the stressing and flexing characteristics of paper fiber.

6 Claims, 3 Drawing Sheets

GEOMETRICALLY-CONFIGURED FLEXIBLE PACKAGING ASSEMBLY

BACKGROUND OF THE INVENTION

1. Field of the Invention

The present invention relates generally to the protective packaging systems and apparatuses therein, and more particularly to a creating a molded pulp cushion and tray packaging apparatus using specific geometrical configurations for protectively accommodating fragile items often associated with electronic equipment, especially during post-manufacturing and transport, without the need for additional packing materials.

2. Description of Related Art

It is known that one way to protect electronic equipment (e.g., computer displays, electronic component boards, thin lead electronics, and the like) is to wrap or surround the equipment in packing foam, bubble wrap or polyurethane pellets before or concurrent with setting such equipment into a shipping container for transport. Other methods includes shipping these electronic components via parallelpiped cardboard containers, specially-molded containers or foam-injected boxing so as to minimize the movement of the equipment during transport. Unfortunately, each of these methods is only satisfactory in protecting the equipment during transport, and each have varied costs associated therewith.

It is also known to use foamed materials and even pulp-based materials in the construction of conventional packaging arrangements and assemblies. However, each has a set of known design and/or use limitations. For foam materials, though cushioning and protection are generally good characteristics, they use too much material and cannot be recycled economically. Pulp-based materials however, though abundant and relatively inexpensive, have proven to be inadequate for the routine or repeated transport of sensitive components and electrical devices. Additionally, though common pulp-based designs may be useable in single use situations, the pulp, due to its nature, begins to crush or tear prematurely and easily. Often, unfortunately, the flexibility of the pulp material (pulp fibers) is limited to a narrow range such that during transport or even packing, overflexing of the pulp fiber is quite common—resulting in tearing and diminished shock protections.

Given the negative economic and environmental aspects of non-pulp-based solutions in packaging, and the limited utility of traditional pulp-based packaging designs, it is desired that a reusable, pulp-based packaging assembly be developed.

SUMMARY OF THE INVENTION

Thus, a packaging apparatus comprising a pulp-based composition that provides protection to an equipment component (or other fragile or breakable item), provides ease in use during pre-packing and packing of an equipment component for transport, does not require the need for additional packing components in combination with the packaging assembly, provides shock protection during transport, is reusable, and is economically suited for its end use, is desired.

Accordingly, the present invention provides a pulp-based protective packaging assembly which overcomes these unresolved problems and deficiencies and sets forth additional advantageous attributes as further detailed by the invention in the manner described hereinbelow.

In accordance with one aspect of the present invention, the present invention is a molded, one piece packing assembly comprised of substantially a pulp-based composition. The present invention is advantageously designed using specific geometries which, contrary to traditional designs, benefit from the stressing and flexing characteristics of paper fiber.

In accordance with yet another aspect of the present invention, the present invention is comprised of pulp-based materials that are readily recyclable, of low cost and/or are environmentally-friendly, such as newsprint.

In one preferred implementation of the present invention, although for the avoidance of doubt the present invention is not so limited thereto, the packaging assembly is a geometrically-shaped packaging cushion for one or more compact discs (CDs).

As used herein, the terms "Equipment Component", "Electronic Component", "Fragile Component" are terms used interchangeably herein to refer to sensitive, fragile or electronic devices, assemblies, instrumentalities or materials (i.e., including but not limited to electronic circuit cards, electronic and computer devices, glass and porcelain materials, breakable items, and similar) that often must be specially wrapped or handled during shipment, transport or when moving from one point to another. Typically, though not necessarily, it is envisioned that certain of these types of electronic components and electronic devices may also be sensitive to radiofrequency (RF) interference, electric field interference (EFI), or electric, electrical, electronic, physical, and/or static shock, and similar. Similarly, the use of the term "front" or "back" to designate a side of the material sheet which is used in the present invention is not used as a limiting term but rather is used to assist in providing clarity to and understanding of the present invention.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
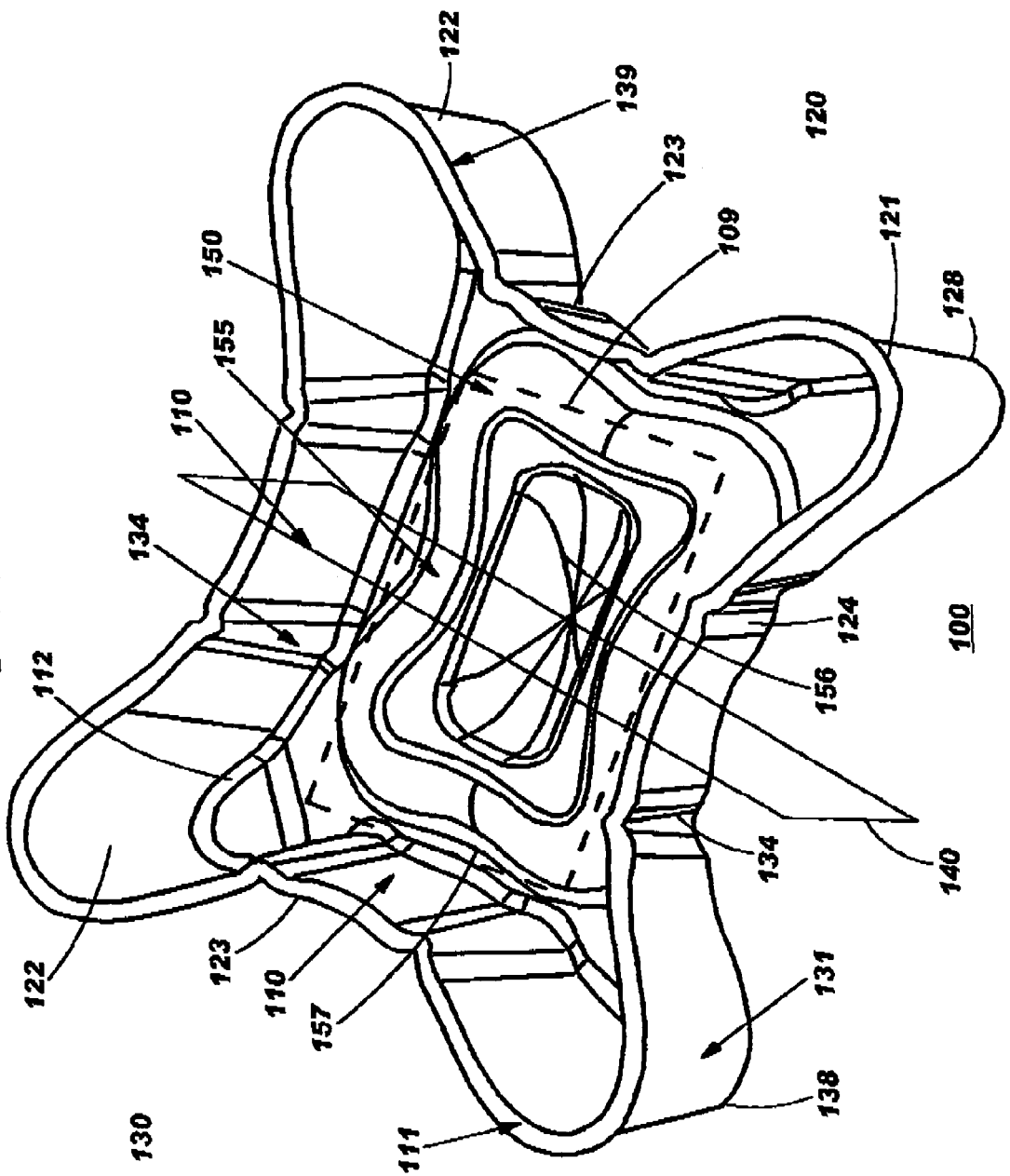
FIG. 1 is an overhead view of the present invention in accordance with a preferred embodiment.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings. Reference herein to "one embodiment" or "an embodiment" means that a particular feature, structure, or characteristic described in connection with the embodiment can be included in at least one embodiment of the invention, but not necessarily in all. The appearances of the phrase "in one embodiment" in various places in the specification, sequentially or otherwise, does not necessarily indicate that each phrase refers to or is used in reference to the same embodiment, nor are separate or alternative embodiments mutually exclusive of other embodiments. The description herein is largely based on a particular packaging system and method based on the use of a single, unitary packaging instrument, as developed by the inventors identified above. Those skilled in the art will appreciate that the description can be equally applied to other packaging systems and methods.

FIG. 1 is an overhead view of the present invention 100 in accordance with a preferred embodiment.

From FIG. 1, the packaging assembly has a sidewall 110, formed from material stock being substantially of a non-rigid composition. By way of example, non-rigid compositions could include cellulose-derived compounds in part, but are preferably compositions having at least 51% pulp-based materials. For clarification in further explanation, the assembly has a proximal side 120 and a distal side 130, in relation to an axial geometric centerplane 140. The present invention is symmetric about the centerplane 140.

From FIG. 1, an outer sidewall 110 has an upper rim 111 having an upper rim perimeter, and a lower rim 112 having a lower rim perimeter. Along the sidewall 110, there are a plurality of arcuate coves (121, 122) and at least a plurality of stress absorbing seams (123, 124) situated on the proximal side 120. Similarly, and symmetrically, Along the sidewall 110, there are also a plurality of arcuate coves (131, 132) and at least a plurality of stress absorbing seams (133, 134) situated on the distal side 130. In a preferred embodiment, the upper rim has a lip edge 139 for additional strength and stabilization of the assembly.

From FIG. 1, the assembly 100 further comprises a lower assembly floor 150 having a plurality of arched base pedestals 128 on the proximal side and a plurality of arched base pedestals 138 on the distal side. The arched base pedestals have a sloping base edge which permits the pedestal to have an outer edge rest on a surface while elevating the upper sloped portion of the pedestal which is configured with the lower floor. As a result, the pedestals are able to absorb certain stresses and shock which may be received by flexing within predetermined ranges. For instance, in a preferred embodiment, there may come to exist a downward pressure on the component area 109. The downward force would, in part, cause the pedestals to flex in accordance with the force and thereby flex, and thus absorb portions of the force without causing the assembly to tear.

The lower floor also comprises an elevated receiving bed 155 for providing added stiffness to said lower assembly floor, a concave dome 156 having a dome perimeter, and an outer floor edge 157 having an outer floor perimeter. The receiving bed is approximately where the component to be transported is placed (109). The concave dome is configured to be radially downward to further permit flexing of the assembly in relation and in conjunction with the receiving bed, the outer floor edge, the absorbing seams and/or the pedestals. Preferably, the lower rim is configured with the outer floor edge to firmly join at a seamed edge where additional stability of the assembly exists. A net result of this configuration is that the lower rim perimeter is equal to the outer floor perimeter.

In operation, for instance, in a preferred embodiment, there may come to exist a downward pressure on the component area 109. The downward force would, in part, cause a force to be exerted on the receiving bed, which would cause, in part the dome to expand favorably with the material fibers. Concurrently, the pressure exerted on the receiving bed would also be translated and distributed to the outer floor edge of the lower floor, where the seams would flex to absorb certain of the forces and the pedestals would also flex (in accordance with that previously described) to absorb certain of the other forces.

Figure 2:
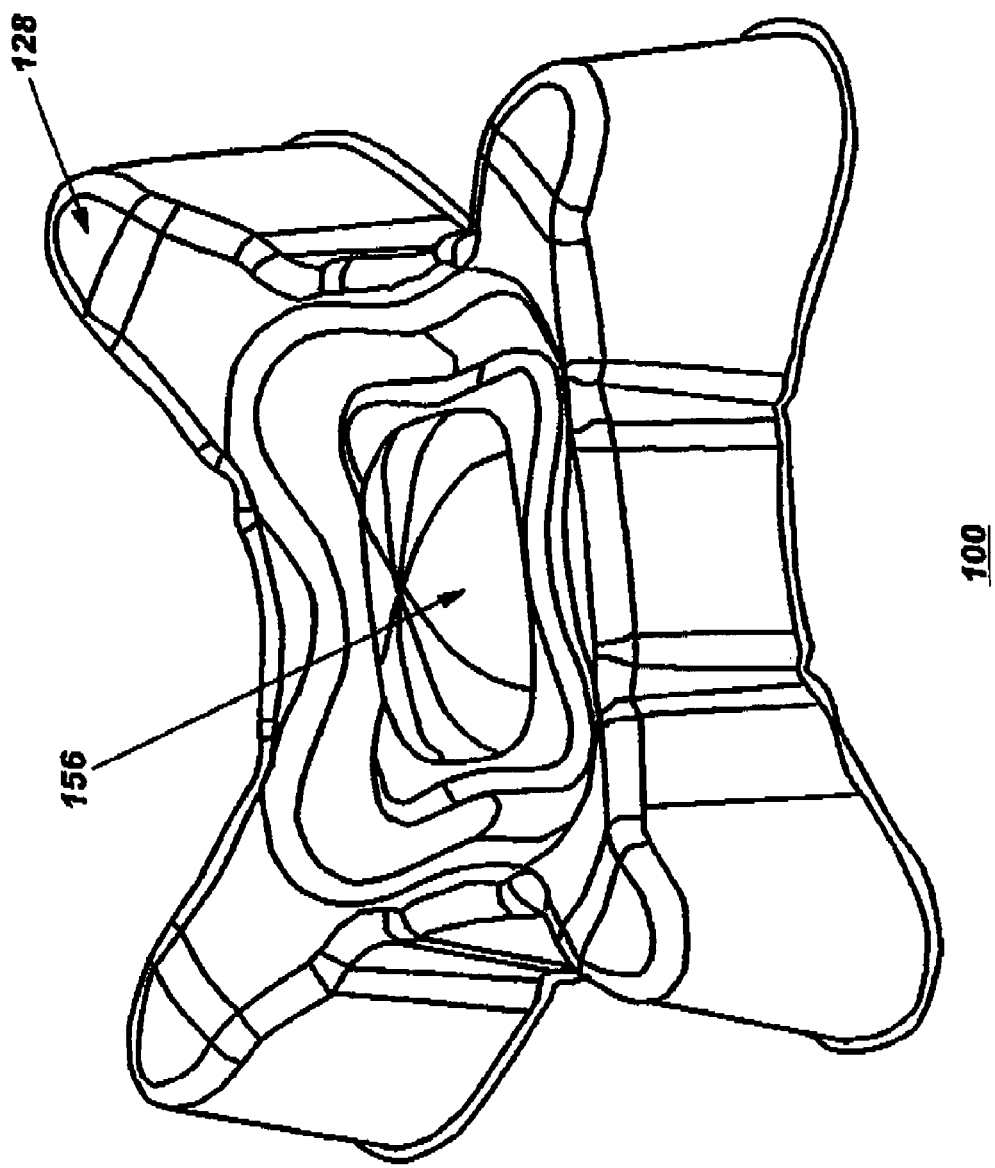
FIG. 2 is a bottom view of the present invention in accordance with a preferred embodiment.

For further exemplification, FIG. 2 sets forth a bottom view of the present invention (100 of FIG. 1) in accordance with a preferred embodiment.

As shown in FIG. 2, the base of the dome (156 of FIG. 1) and the base of pedestal (128 of FIG. 1) are shown. From FIG. 2, the assembly's 100 plurality of arched base pedestals 128 have a sloping base edge which permits the pedestal to have an outer edge rest on a surface while elevating the upper sloped portion of the pedestal which is configured with the lower floor.

Figure 3:
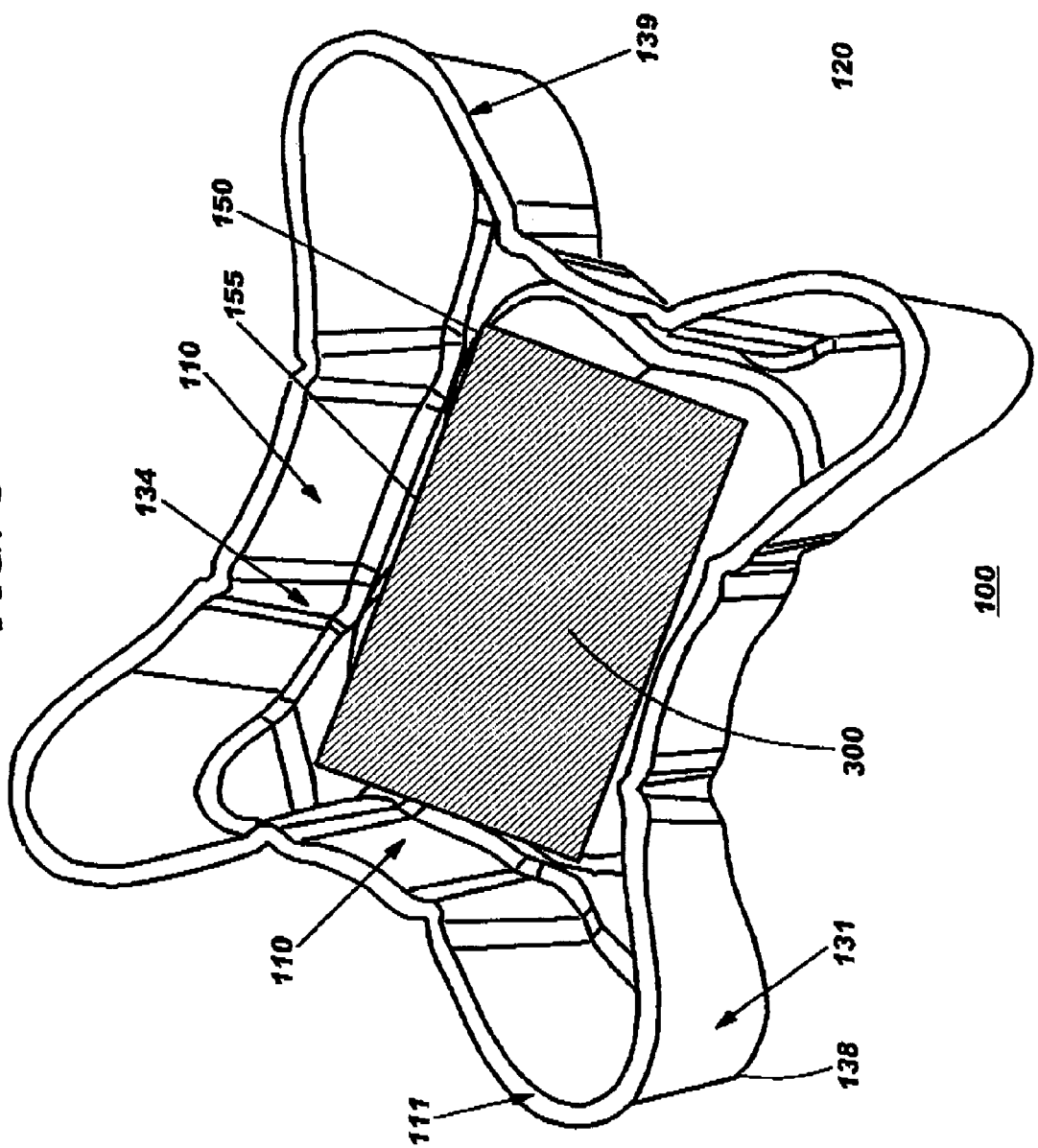
FIG. 3 is an overhead view of the present invention with a component seated therein in accordance with a preferred embodiment.

FIG. 3 is an overhead view of the present invention 100 with a component 300 seated therein in accordance with a preferred embodiment. As is evident from FIG. 3, the interior opening of the assembly is dependent and ideally configured in relation to the dimensions of the component to be used therein.

In a preferred embodiment, following placement of a component within an assembly, a cover may be placed and affixed onto the upper rim of the assembly for shipping. It is envisioned that the cover may be most any material such as a linear piece of protective material (plastic or cardboard) configured to be attached with the upper rim, or a second assembly inserted such that its base is in contact near a component in a first assembly below.

In practice, multiple devices could be shipped using the present invention, where a component 300 is placed at a predetermined location 109 within an assembly 100, and a second, identical assembly is placed on top of the first assembly and component. A second component is then placed within the second assembly.

In a preferred embodiment, the present invention is a protective packaging assembly, having a "butterfly" type of configuration, for shipping compact discs drives (CDDs). In another preferred embodiment, the present invention is a protective "butterfly-configured" packaging assembly for shipping optical drives (ODs). ODs pose a particular problem in transport, as an OD has a fragility level of approximately 50 G range, however, the butterfly configuration assists in translating and distributing stresses and shocks towards various geometric arrangements in the present invention.

Accordingly, the assembly may be provided in a kit form as well, where the preform is supplied in concert with the component, and optionally, with an encompassing shipping container. As used herein, sealing means and securing material shall include but not be limited by materials and sealant technologies such as tape, glue, thermal activated adhesives and the like. Similarly, it is envisioned that instructions may also accompany a preform in a kit form to be instructive as to how to assemble said preform into a package assembly.

It will be further understood that various changes in the details, materials, and arrangements of the parts which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A unitary packaging assembly kit comprising at least one packaging assembly formed from material stock being substantially of a non-rigid composition, having a butterfly geometry, comprising:
- an outer sidewall having i) a plurality of arcuate coves, wherein each of the arcuate coves has a first end and a second end, and ii) a plurality of stress absorbing seams, such that a stress absorbing seam is situated at the first end and the second end of each arcuate cove; and
- a lower assembly floor that is framed by the outer sidewall, the lower assembly floor having
  i) an elevated receiving bed that includes a concave dome having a dome perimeter, and
  ii) an electrical component that is on the elevated receiving bed.

2. The kit of claim 1, further comprising instructions.

3. The assembly of claim 1, wherein said non-rigid composition is primarily pulp-based.

4. The assembly of claim 3, wherein said pulp-based composition is primarily newsprint.

5. The assembly of claim 1, wherein the outer sidewall has a lower perimeter having a lower rim that is coupled to the lower assembly floor and an upper perimeter, and further wherein said lower perimeter is less than said upper perimeter.

6. The assembly of claim 1, wherein said dome has a non-circular perimeter.

* * * * *